(12) United States Patent
Duckett, III

(10) Patent No.: US 9,091,844 B2
(45) Date of Patent: Jul. 28, 2015

(54) LENS DESIGN FORMS WITH NO 3RD OR 5TH ORDER ABERRATIONS

(71) Applicant: George E. Duckett, III, Castaic, CA (US)

(72) Inventor: George E. Duckett, III, Castaic, CA (US)

(73) Assignee: KARL STORZ IMAGING, INC., Goleta, CA (US)

( * ) Notice: Subject to any disclaimer, the term of this patent is extended or adjusted under 35 U.S.C. 154(b) by 0 days.

(21) Appl. No.: 13/923,964

(22) Filed: Jun. 21, 2013

(65) Prior Publication Data

US 2013/0342920 A1      Dec. 26, 2013

Related U.S. Application Data

(60) Provisional application No. 61/663,923, filed on Jun. 25, 2012.

(51) Int. Cl.
*G02B 27/00* (2006.01)
*G02B 23/24* (2006.01)

(52) U.S. Cl.
CPC .......... *G02B 27/0025* (2013.01); *G02B 23/243* (2013.01)

(58) Field of Classification Search
CPC .......................... G02B 23/243; G02B 27/0025
USPC ......... 359/362, 649, 656, 658, 659, 713, 714, 359/756, 757

See application file for complete search history.

(56) References Cited

U.S. PATENT DOCUMENTS

| 5,546,229 | A | 8/1996 | Aoki |
| 5,841,295 | A | 11/1998 | Kaviani |
| 5,995,295 | A | 11/1999 | Nagaoka |
| 7,262,922 | B2 * | 8/2007 | Yamaguchi ................... 359/656 |
| 7,821,720 | B2 | 10/2010 | Wang et al. |
| 8,098,441 | B2 | 1/2012 | Sasamoto |
| 8,164,834 | B2 | 4/2012 | Miyano |
| 2003/0189764 | A1 | 10/2003 | Kashiki |

FOREIGN PATENT DOCUMENTS

| EP | 2 680 060 A2 * | 1/2014 |
| WO | 9963379 A1 | 12/1999 |

OTHER PUBLICATIONS

European Search Report Application No. EP 13 17 3630 Completed: Sep. 18, 2013; Mailing Date: Sep. 30, 2013 6 pages.

* cited by examiner

*Primary Examiner* — David N Spector
(74) *Attorney, Agent, or Firm* — Whitmyer IP Group LLC

(57) ABSTRACT

The invention is directed to correcting compound lens forms for 3rd and 5th order ray aberrations. All lens design forms have limiting aberrations. The proposed classes of lenses can be corrected for all 3rd and 5th order ray aberrations. The limiting aberrations are seventh order or higher. A variety of these lenses are disclosed here for the sake of example. These lens design forms can be used in various applications including the objective lens for an endoscope or other optical instrument.

3 Claims, 8 Drawing Sheets

LENS DESIGN FORMS WITH NO 3RD OR 5TH ORDER ABERRATIONS

FIELD OF THE INVENTION

The invention is directed to compound lens design forms, and more specifically to correcting compound lens forms for $3^{rd}$ and $5^{th}$ order ray aberrations.

BACKGROUND OF THE INVENTION

All lens design forms have limiting aberrations. The proposed classes of lenses can be corrected for all 3rd and 5th order ray aberrations. The limiting aberrations are seventh order or higher. A variety of these lenses are disclosed here for the sake of example. These lens design forms can be used in various applications including the objective lens for an endoscope or other optical instrument.

Aberrations

An optical aberration is a defect in the image forming capability of a lens or optical system, and may be considered to be a departure of the performance of an optical system from the predictions of paraxial optics. In an imaging system, it occurs when light from one point of an object does not converge into (or does not diverge from) a single point after transmission through the system.

Aberrations can be expressed as discrepancies from paraxial theory. In terms relating to the underlying mathematics of the system, aberrations can be categorized as first order, third order, fifth order, seventh order, etc.

First Order Aberrations

Chromatic aberration arises because the index of refraction of a material is different for light of different wavelengths. First order chromatic aberration consists of two components, focus shift, and magnification differences for various wavelengths. A common example of this effect is observed when white light striking a prism breaks up into colored rays. As result of this effect, the image formed by a lens will be different for each color component of light.

Third Order Aberrations

For finite field angles and apertures, light rays do not focus neatly at a point. Accordingly, no precise image is formed. These deviations from focus may be described by third order theory in terms of the five "Seidel" aberrations. These are monochromatic aberrations characterized by certain geometric effects.

Spherical aberration—Spherical aberration is an axial aberration and so may be completely described by meridional rays. Light rays in the paraxial region focus at a different point than light rays going through the periphery of the lens. The distance between the two foci is the lateral spherical aberration. The case where the peripheral rays are more bent than the paraxial rays is called positive spherical aberration. The case where the peripheral rays are bent and the peripheral focus is farther from the lens, is called negative spherical aberration. The lateral spherical aberration is proportional to the square of the entrance pupil diameter.

Spherical aberration can be controlled by balancing surfaces having positive spherical aberration with surfaces having negative spherical aberration, or by using a small aperture stop.

Coma—Like spherical aberration, coma is an aperture dependent aberration. However, unlike spherical aberration it only affects off-axial rays. The comatic blur is asymmetric and "comet shaped", hence the name coma.

Coma may be eliminated in a lens by appropriate choice of curves. It may be minimized by using a small aperture stop Curvature of field—In curvature of field a plane object is sharply imaged, but on a curved surface. The surface on which the image is formed is called the Petzval surface.

Curvature of field may be corrected by balancing components contributing negative field curvature with components contributing positive field curvature.

Distortion—In distortion, the object is sharply imaged but does not retain its shape. There are two kinds of distortion, barrel distortion and pincushion distortion, so named because of their effect on the image of a square grid target.

Distortion can be corrected by balancing surfaces contributing barrel distortion to those contributing pincushion distortion. A perfectly symmetric system will have no distortion. Changing the aperture size has no effect on distortion.

Astigmatism—Astigmatism refers to the differing focal positions for rays in the tangential and sagittal planes. While each plane focuses to a perfect point, in the astigmatic image these focus planes are not coincident. Astigmatism is not present on-axis, but increases as the field angle increases.

Astigmatism can be corrected by balancing components contributing negative astigmatism with components contributing positive astigmatism.

Fifth Order Aberrations

There are nine secondary or fifth-order aberrations:

Secondary spherical aberration—there is one form of fifth order spherical aberration, and there are two forms of fifth order oblique spherical aberration.

Secondary coma—there is one form of fifth order linear coma, and there are two forms of fifth order elliptical coma.

Secondary curvature of field—there is one form of fifth order sagittal field curvature.

Secondary distortion—There is one form of fifth order distortion.

Secondary astigmatism—there is one form of fifth order astigmatism

Optical Systems

A lens or group of lenses can be arranged to form an optical system. The lenses in such systems are typically arranged such that they are all coaxial with the same optical axis, although for some applications this may not necessarily be the case. Over the history of lens design, various categories of optical systems have been explored. Some examples of lens designs include five element lens designs, reverse telephoto lens designs, and Biogon™ type lens designs.

However, prior lens designs of each of these types have not been known to be correctable for all $3^{rd}$ and $5^{th}$ order aberrations.

It is therefore desired to provide lens design forms that account for these deficiencies

SUMMARY OF THE INVENTION

Accordingly, it is an object of the invention to provide a five element lens design that is correctable for all $3^{rd}$ and $5^{th}$ order aberrations.

It is a further object of the invention to provide a reverse telephoto lens design that is correctable for all $3^{rd}$ and $5^{th}$ order aberrations It is another object of the invention to provide a six element Biogon type lens design that is correctable for all $3^{rd}$ and $5^{th}$ order aberrations.

DETAILED DESCRIPTION OF THE INVENTION

Figure 1:
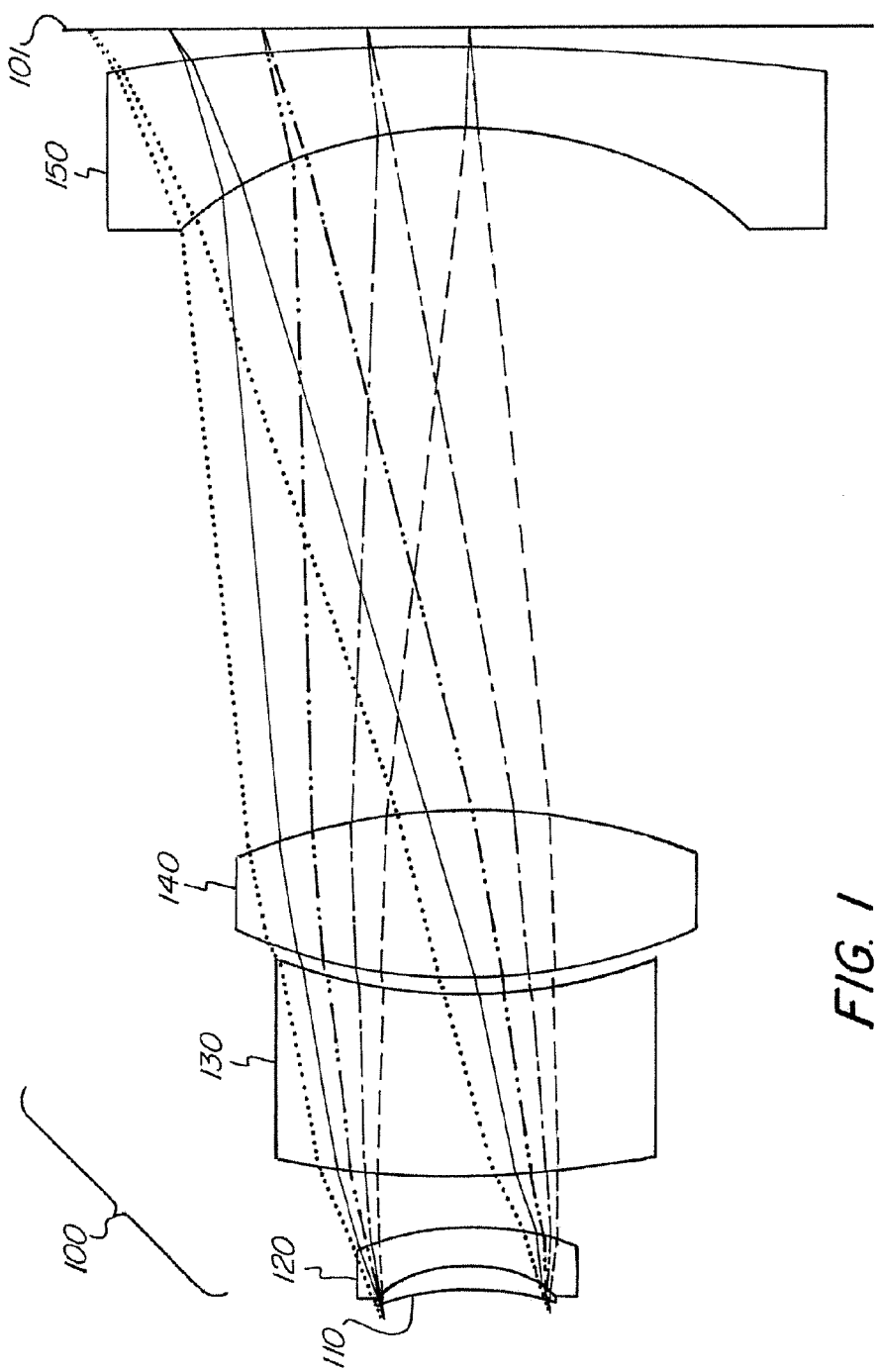
FIG. 1 is a diagram illustrating a five element lens design according to aspects of the invention.

FIG. 1 is a diagram illustrating a five element lens design 100 which is correctable for all $3^{rd}$ and $5^{th}$ order aberrations according to aspects of the invention.

Lens design 100 includes the following lenses, arranged coaxially and in order, described from the object (not shown) to the image plane 101:

Lens 110, which is a positive meniscus lens, arranged with its concave side oriented toward the object.

Lens 120, which is a negative meniscus lens, arranged with its concave side oriented toward the object. Lens 120 may form a doublet with 110.

Lens 130, which is a negative meniscus lens, arranged with its convex side oriented toward the object.

Lens 140, which is a biconvex lens.

Lens 150, which is a negative meniscus lens, arranged with its concave side oriented toward the object.

Lens design 100 can be made achromatic with the addition of one further element.

Figure 2:
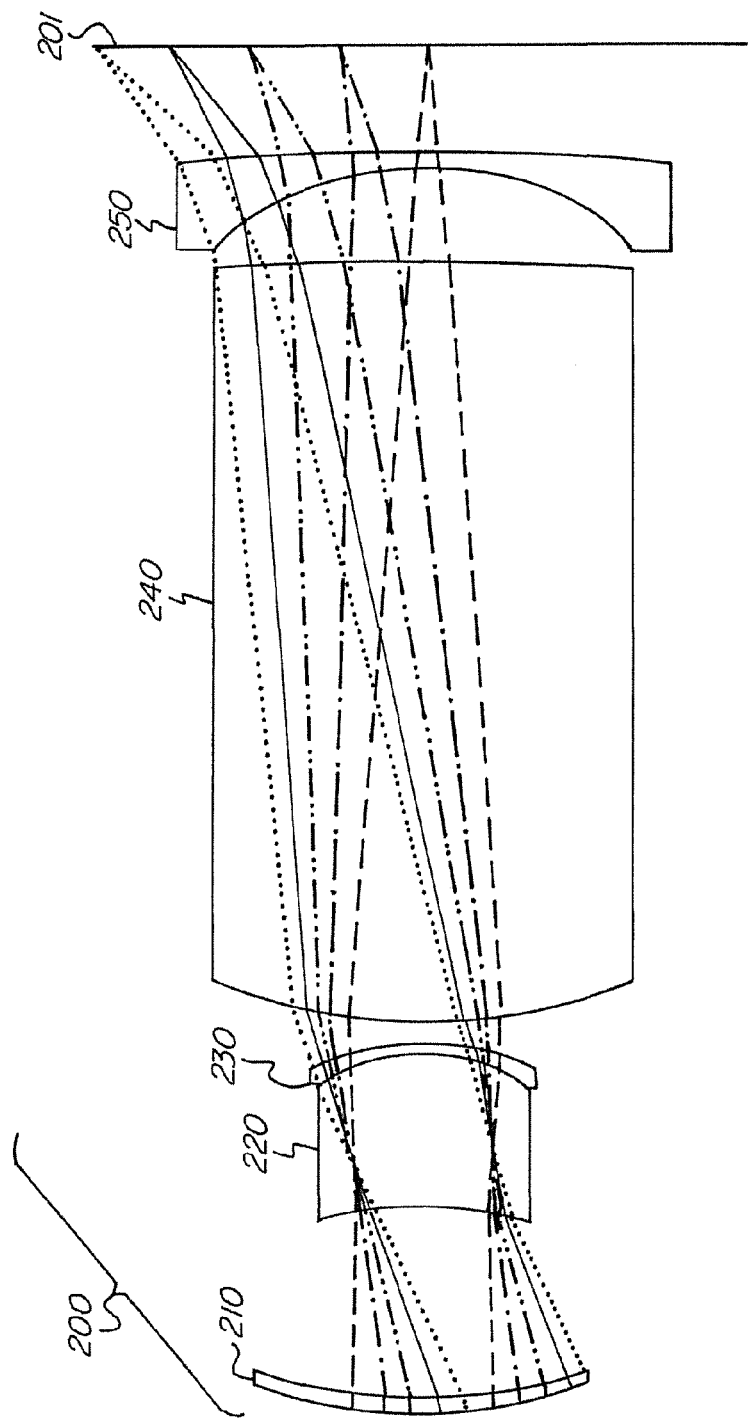
FIG. 2 is a diagram illustrating another five element lens design according to aspects of the invention.

FIG. 2 is a diagram illustrating a five element lens design 200 which is correctable for all $3^{rd}$ and $5^{th}$ order aberrations according to aspects of the invention.

Lens design 200 includes the following lenses, arranged coaxially and in order, described from the object (not shown) to the image plane 201:

Lens 210, which is a positive meniscus lens, arranged with its convex side oriented toward the object.

Lens 220, which is a positive meniscus lens, arranged with its concave side oriented toward the object.

Lens 230, which is a negative meniscus lens, arranged with its concave side oriented toward the object. This lens may form a doublet with Lens 220.

Lens 240, which is a biconvex lens. Lens 240 may have a side oriented toward the object having a greater convexity than the side oriented toward the image.

Lens 250, which is a negative meniscus lens, arranged with its concave side oriented toward the object.

Lens design 200 can be made achromatic with the addition of one further element.

Figure 3:
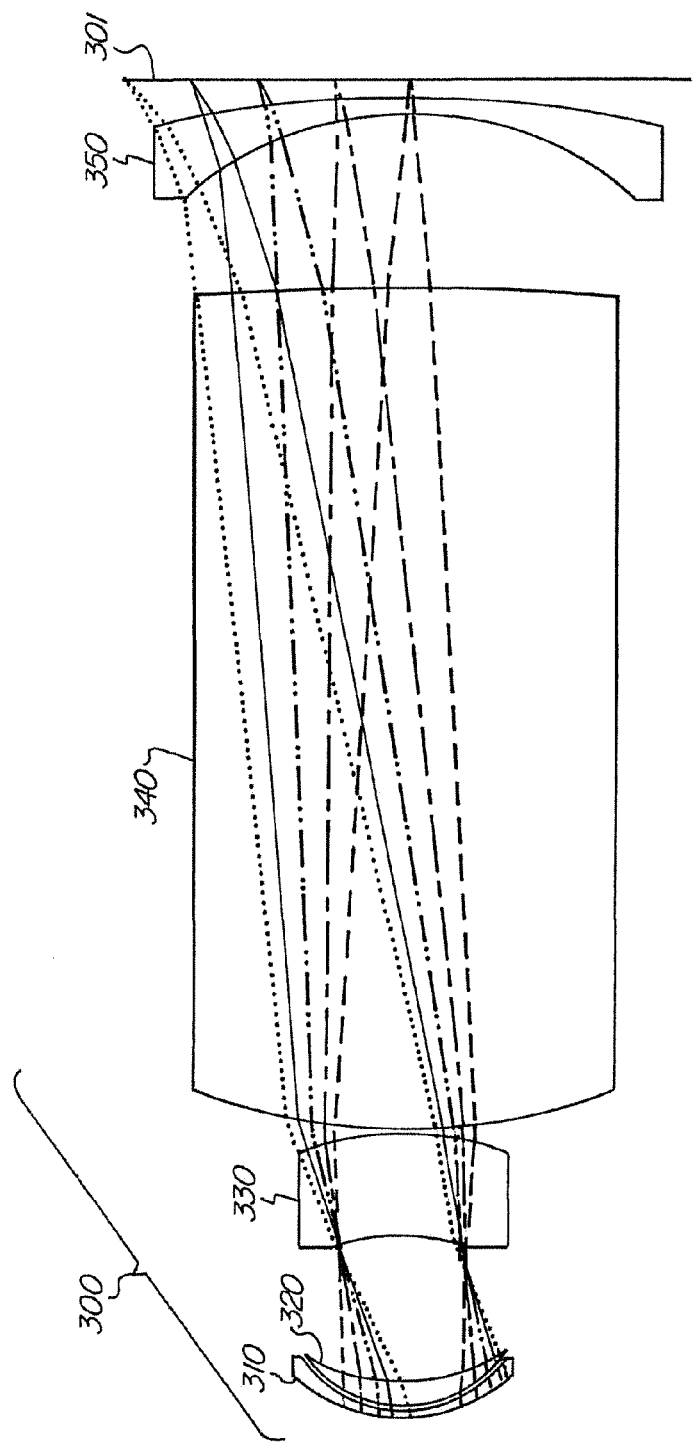
FIG. 3 is a diagram illustrating a further five element lens design according to aspects of the invention.

FIG. 3 is a diagram illustrating a five element lens design 300 which is correctable for all $3^{rd}$ and $5^{th}$ order aberrations according to aspects of the invention.

Lens design 300 includes the following lenses, arranged coaxially and in order, described from the object (not shown) to the image plane 301:

Lens 310, which is a negative meniscus lens, arranged with its convex side oriented toward the object.

Lens 320, which is a positive meniscus lens, arranged with its convex side oriented toward the object. Lens 320 may form a doublet with lens 310.

Lens 330, which is a positive meniscus lens, arranged with its concave side oriented toward the object.

Lens 340, which is a biconvex lens, arranged with a side having greater convexity oriented toward the object.

Lens 350, which is a negative meniscus lens, arranged with its concave side oriented toward the object.

Lens design 300 can be made achromatic with the addition of one further element.

Figure 4:
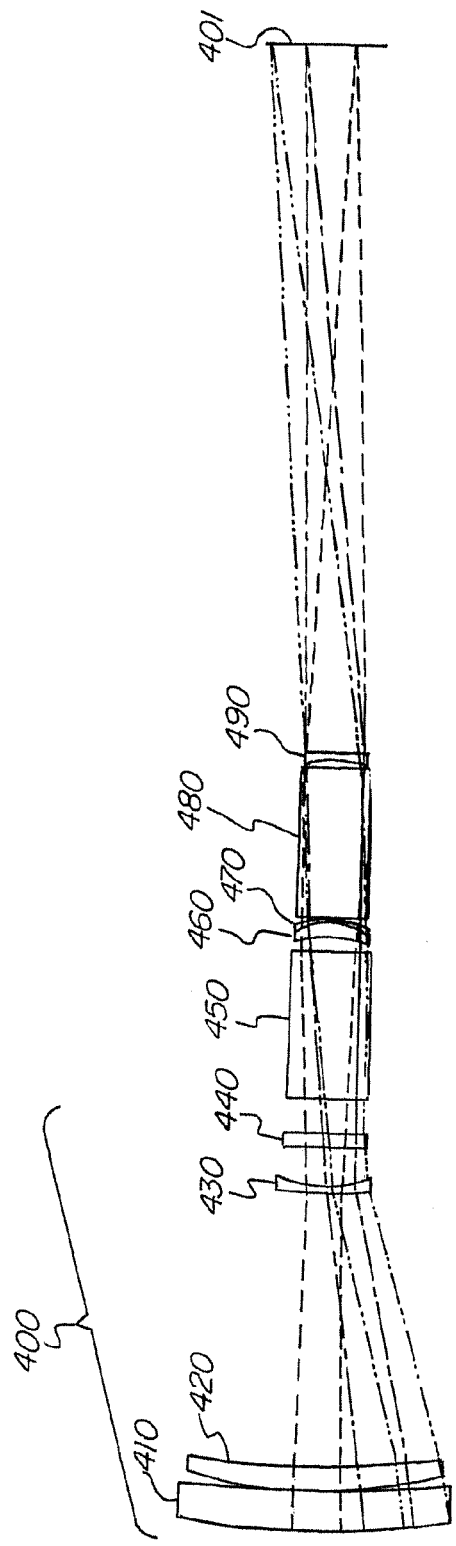
FIG. 4 is a diagram illustrating a reverse telephoto lens design according to aspects of the invention.
Figure 4A:
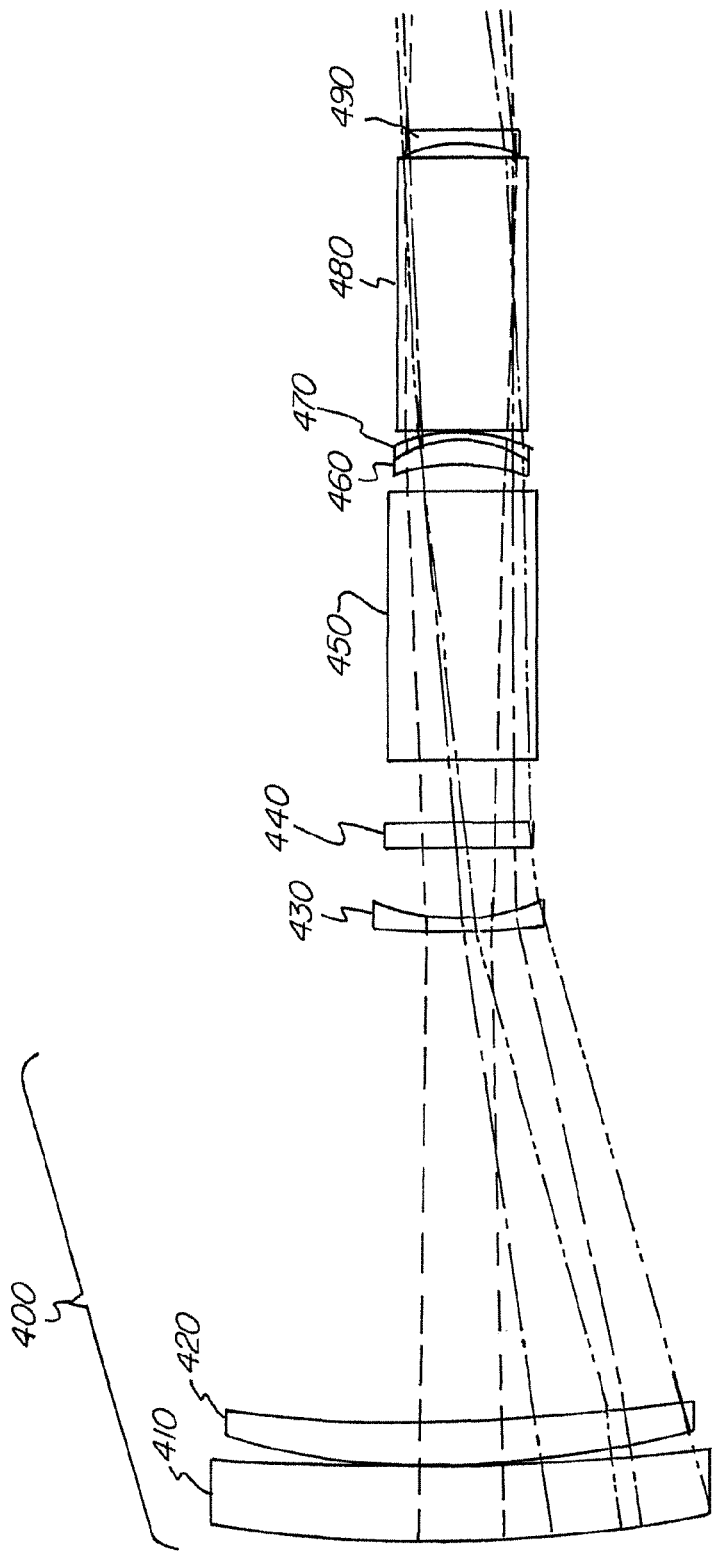
FIG. 4a is an enlarged view of the reverse telephoto lens design illustrated by FIG. 4.

FIG. 4 is a diagram illustrating an example reverse telephoto lens design having a back focal length at least as long as the effective focal length and which is correctable for all $3^{rd}$ and $5^{th}$ order aberrations according to aspects of the invention. FIG. 4a is a view of the lens elements of FIG. 4 which has been enlarged for clarity.

Lens design 400 is an example of a family of such lenses having in common the first, second, and third lenses, and having a back focal length at least as long as the effective focal length. Lens design 400 includes the following lenses, arranged coaxially and in order, described from the object (not shown) to the image plane 401:

Lens 410, which is a positive meniscus lens, arranged with its convex side oriented toward the object.

Lens 420, which is a positive meniscus lens, arranged with its convex side oriented toward the object.

Lens 430, which is a negative meniscus lens, arranged with its convex side oriented toward the object.

Lens 440, which is a plano-convex lens, arranged with its planar side oriented toward the object.

Lens 450, which is a biconvex lens.

Lens 460, which is a positive meniscus lens, arranged with its concave side oriented toward the object.

Lens 470, which is a negative meniscus lens, arranged with its concave side oriented toward the object. Lens 470 may form a doublet with lens 460.

Lens 480, which is a biconvex lens.

Lens 490, which is a negative meniscus lens, arranged with its concave side oriented toward the object.

Figure 5:
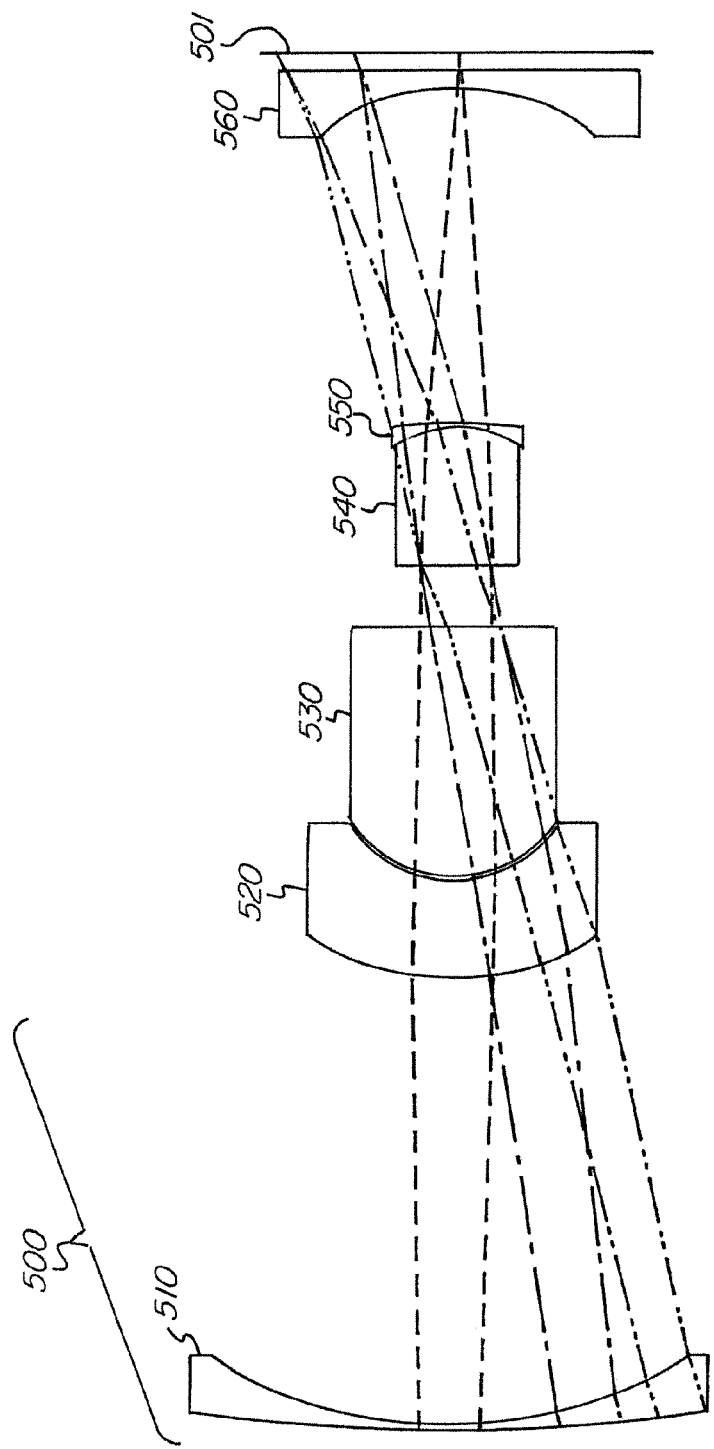
FIG. 5 is a diagram illustrating Biogon-type lens design according to aspects of the invention.

FIG. 5 is a diagram illustrating a six-element Biogon™ type lens design which is correctable for all $3^{rd}$ and $5^{th}$ order aberrations according to aspects of the invention.

Lens design 500 includes the following lenses, arranged coaxially and in order, described from the object (not shown) to the image plane 501:

Lens 510, which is a negative meniscus lens, arranged with its convex side oriented toward the object.

Lens 520, which is a negative meniscus lens, arranged with its convex side oriented toward the object.

Lens 530, which is a positive meniscus lens, arranged with its convex side oriented toward the object.

Lens 540, which is a biconvex lens. Lens 540 may have a side oriented toward the object having a lesser convexity than the side oriented toward the image.

Lens 550, which is a negative meniscus lens, arranged with its concave side oriented toward the object, and may form a doublet with lens 540.

Lens 560, which is a plano-concave lens, arranged with its concave side oriented toward the object.

Figure 6:
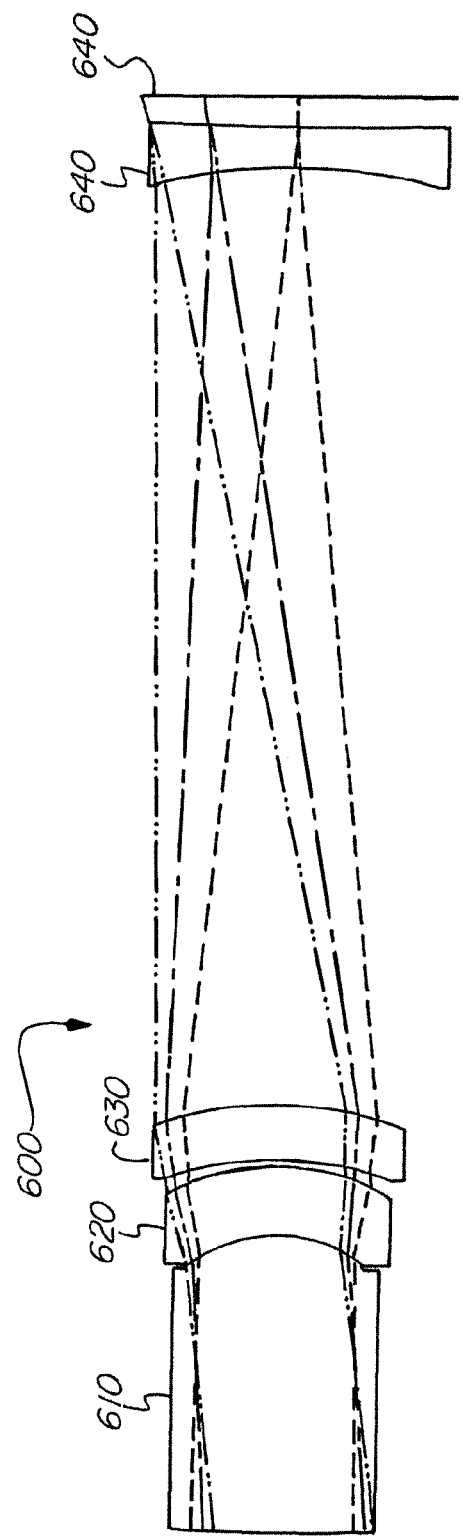
FIG. 6 is a diagram illustrating a four element lens design according to aspects of the invention.

FIG. 6 is a diagram illustrating a four element lens design 600 which is correctable for all $3^{rd}$ and $5^{th}$ order aberrations according to aspects of the invention.

Lens design 600 includes the following lenses, arranged coaxially and in order, described from the object (not shown) to the image plane 601:

Lens 610, which is a biconvex lens. Lens 610 may have a side oriented toward the object having a lesser convexity than the side oriented toward the image.

Lens 620, which is a negative meniscus lens, arranged with its concave side oriented toward the object. Lens 620 may form a doublet with 610.

Lens 630, which is a positive meniscus lens, arranged with its concave side oriented toward the object.

Lens 640, which is a biconcave lens. Lens 640 may have a side oriented toward the object having a greater concavity than the side oriented toward the image.

Figure 7:
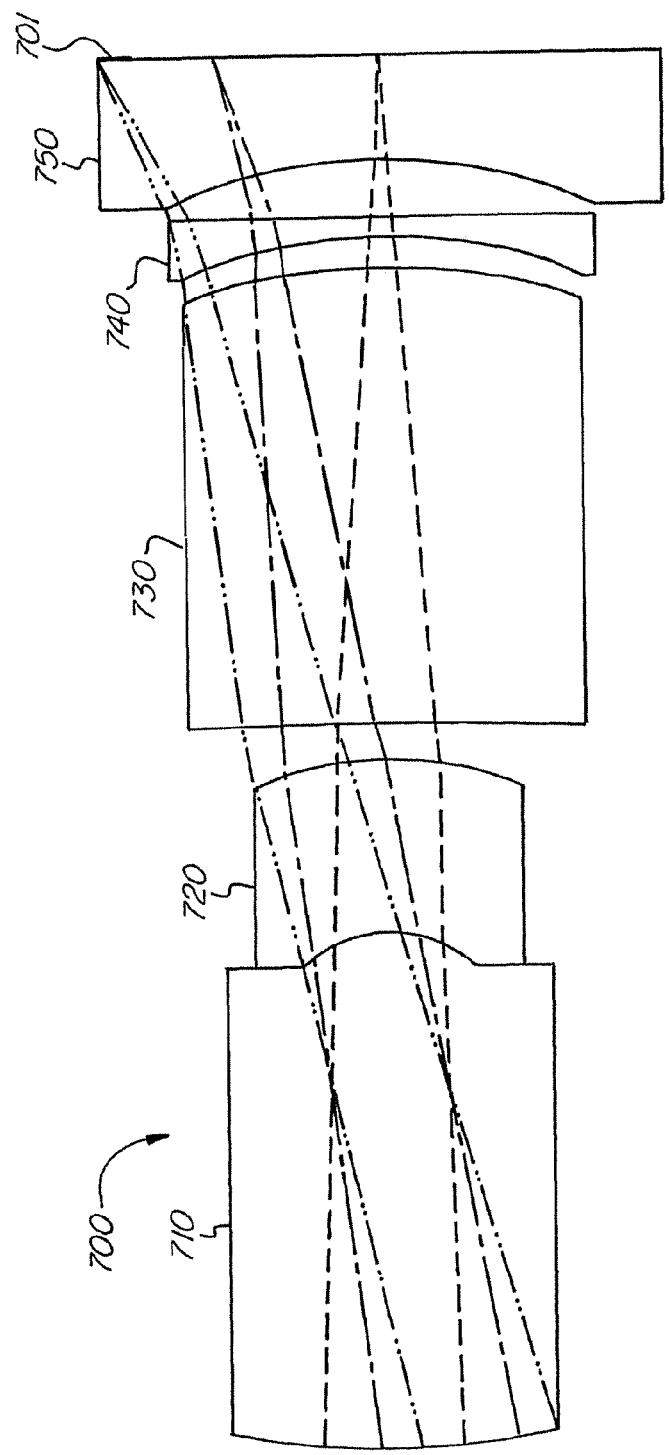
FIG. 7 is a diagram illustrating another five element lens design according to aspects of the invention.

FIG. 7 is a diagram illustrating a five element lens design 700 which is correctable for all $3^{rd}$ and $5^{th}$ order aberrations according to aspects of the invention.

Lens design 700 includes the following lenses, arranged coaxially and in order, described from the object (not shown) to the image plane 701:

Lens 710, which is a biconvex lens. Lens 710 may have a side oriented toward the object having a lesser convexity than the side oriented toward the image.

Lens 720, which is a negative meniscus lens, arranged with its concave side oriented toward the object. Lens 720 may form a doublet with 710.

Lens 730, which is a positive meniscus lens, arranged with its concave side oriented toward the object.

Lens 740, which is a negative meniscus lens, arranged with its concave side oriented toward the object.

Lens 750, which is a plano-concave lens, arranged with its concave side oriented toward the object.

This design has the added advantage that it can be corrected for all first order chromatic aberrations without an additional element.

Although the invention has been described with reference to a particular arrangement of parts, features and the like, these are not intended to exhaust all possible arrangements or features, and indeed many modifications and variations will be ascertainable to those of skill in the art.

What is claimed is:

1. An optical system having an object side and an image side comprising:
   a compound lens correcting all third order aberrations and all fifth order aberrations, said compound lens having in order from the object side to the image side:
   a first lens, which is positive meniscus and concave to the object side;
   a second lens, which is negative meniscus and concave to the object side;
   a third lens, which is negative meniscus and convex to the object side;
   a fourth lens, which is biconvex; and,
   a fifth lens, which is negative meniscus and concave to the object side;
   wherein the second lens and the third lens are adjacent to each other.

2. The optical system of claim 1, wherein the first lens and the second lens are arranged as a doublet.

3. The optical system of claim 1, wherein the optical system is achromatic.

* * * * *